United States Patent [19]
Torre

[11] Patent Number: 5,773,558
[45] Date of Patent: Jun. 30, 1998

[54] TRANSPARENT, COLORLESS, AMORPHOUS POLYAMIDES AND MOLDED ARTICLES

[75] Inventor: Hans Dalla Torre, Domat/EMS, Switzerland

[73] Assignee: EMS-Inventa AG, Zürich, Switzerland

[21] Appl. No.: 936,807

[22] Filed: Sep. 24, 1997

Related U.S. Application Data

[63] Continuation-in-part of Ser. No. 555,790, Nov. 9, 1995, Pat. No. 5,696,202.

[30] Foreign Application Priority Data

| Feb. 1, 1995 | [SE] | Sweden | 00270/95 |
| Sep. 19, 1995 | [EP] | European Pat. Off. | 95114719 |

[51] Int. Cl.$^6$ ................................. C08G 69/26
[52] U.S. Cl. ................ 528/335; 528/339; 528/344; 528/346; 528/347; 525/540; 524/81; 524/606
[58] Field of Search .................. 528/335, 339, 528/344, 346, 347; 525/540; 524/81, 606

[56] References Cited

U.S. PATENT DOCUMENTS

| 2,512,606 | 9/1950 | Bolton et al. | 528/346 |
| 2,696,482 | 12/1954 | Pease | 528/340 |
| 3,597,400 | 8/1971 | Kashiro et al. | 528/338 |
| 4,207,411 | 6/1980 | Shue | 528/338 |
| 4,369,305 | 1/1983 | Pagilagan | 528/338 |
| 4,847,356 | 7/1989 | Hoppe et al. | 528/346 |
| 5,310,860 | 5/1994 | Maj et al. | 528/346 |

FOREIGN PATENT DOCUMENTS

| 0 050 742 A1 | 5/1982 | European Pat. Off. . |
| 0 069 700 A1 | 1/1983 | European Pat. Off. . |
| 628602 | 12/1994 | European Pat. Off. . |
| 15 95 354 C3 | 10/1966 | Germany . |
| 2 034 541 | 7/1970 | Germany . |
| 37 17 928 A1 | 5/1987 | Germany . |
| 37 28 334 A1 | 8/1987 | Germany . |
| 43 10 970 A1 | 4/1993 | Germany . |

*Primary Examiner*—Samuel A. Acquah
*Attorney, Agent, or Firm*—Browdy and Neimark

[57] ABSTRACT

Colorless, amorphous polyamide, or blends or alloys thereof, and the molded articles with high alternate bending strengths are made available; they are preferably made up of unbranched aliphatic diamines and cycloaliphatic dicarboxylic acids, and have high strength, high rigidity, high heat distortion, and good solvent resistance.

16 Claims, No Drawings

TRANSPARENT, COLORLESS, AMORPHOUS POLYAMIDES AND MOLDED ARTICLES

This is a CIP of parent application Ser. No. 08/555,790, filed Nov. 9, 1995, now U.S. Pat. No. 5,696,202.

Priority is claimed from the priority applications of the parent application of Feb. 1, 1995 and Sep. 19, 1995.

The subject of the present invention is transparent, colorless and amorphous polyamides and blends or alloys thereof with homopolyamides, and the molded articles that can be made thereof, which have high tenacity, good solvent resistance, and at the same time high rigidity and a high heat distortion temperature and high fatigue resistance strengths to alternating bending, and which in contrast to the prior art are colorless.

In European Patents EP 50 742 and EP 69 700 and U.S. Pat. Nos. 2,696,482, 3,597,400, 4,207,411 and 4,369,305, amorphous polyamides of aliphatic diamines and/or 4,4'-diaminodicyclohexylmethane (PACM) and aromatic dicarboxylic acids are described, but they have inadequate tenacity and transparency and are not colorless.

The polyamides of U.S. Pat. No. 2,512,606 and published German Patent Disclosure Application DE-OS 20 34 541 of aliphatic dicarboxylic acids and unsubstituted cycloaliphatic diamines with a high proportion of trans-trans-isomer are inadequately resistant to stress cracking in boiling water and alcohols, and in some cases are cloudy. Finally, the polyamides described in German Patent Disclosure DE 43 10 970 require an especially high proportion of trans-trans-isomer of from 35 to 60% of the 4,4'-diaminodicyclohexylmethane, which is attained only by means of special reaction conditions with expensive distillative fractionation in the production of the diamine. This makes these diamines not inconsiderably more expensive. They were commercially available under the tradenames PACM 50® (DuPont, Wilmington, Del.) and Wondamin® (New Japan Chemical Corporation, Osaka). Dicycan® (BASF), an unsubstituted bis(4-aminocyclohexyl)methane, has similar high trans-trans-isomer proportions. Although these diamines do bring about satisfactory tenacity of the polyamide, nevertheless the resistance to alternate bending stress and the dimensional stability under temperature of the shaped articles made from them is inadequate for certain applications, such as filter bowls in a relatively high temperature range.

German Patent Disclosure DE 15 95 354 describes a process for preparing cristal-clear polyamides from dicarboxylic acids and a defined isomer mixture of bis(aminocyclohexyl)propane, which can contain up to 80% caprolactam. The later "clouding" of those polyamides that contain dodecanedioic acid as the dicarboxylic acid is expressly mentioned.

German Patent Disclosure DE 37 17 928 covers transparent copolyamides of preferably aromatic dicarboxylic acids containing the isomers, no longer available today, of bis(4-amino-3-methyl-5-ethylcyclohexyl)methane, which have insufficiently high Tg values, and German Patent Disclosure DE 37 28 334 claims blends, with modified impact strength, of copolyamides of aromatic dicarboxylic acids and a mixture of hexamethylene diamine and PACM, which again have likewise low Tg values.

The object was accordingly to furnish polyamide molding compositions that make it possible to overcome the disadvantages of the prior art.

This object is attained by the transparent, colorless and amorphous polyamides, and their blends or alloys, in accordance with the characteristics of claim 1, and by the molded articles that can be made thereof as defined by claim 9.

In particular, it is attained by polyamides, as well as blends and alloys, of at least one aliphatic homopolyamide with these polyamides, in which preferably long-chain aliphatic diamine units are combined with cycloaliphatic dicarboxylic acid units, which as a result of this combination of (1) long-chain aliphatic and (2) cyclo aliphatic monomer units having at least one cyclohexane ring shows extremely high alternating bending strengths and at the same time high tenacity, high rigidity, high heat distortion temperature and good solvent resistance.

Said long-chain unsubstituted aliphatic diamines, preferably those with from 8 to 14 carbon atoms, can be combined with cycloaliphatic dicarboxylic acids that have 8 to 22 carbon atoms and at least one cyclohexane ring.

In special cases these acids can be replaced with a maximum of 20 weight %, and preferably a maximum of 10 weight %, of at least one aromatic dicarboxylic acid, which are preferred terephthalic acid, isophthalic acid and 2,6-naphthalene dicarboxylic acid. The term cycloaliphatic dicarboxylic acids is understood to mean those that have one or more cyclohexane rings, whereby cyclohexane dicarboxylic acids are preferred.

A preferred embodiment of this invention is the combination of nonane diamine, decane diamine or dodecane diamine with 1,4-cyclohexane dicarboxylic acids for the polyamides according to the invention, which alone or in blends or mixtures with homopolyamides, are suitable for molded articles that are highly ductile, extraordinarily resistant to alternate bending and nevertheless rigid and resistant to stress cracking in alcohol, ketones and hot water and have high heat distortion temperature.

The polyamides according to the invention may be prepared by processes of the prior art under pressure in autoclaves or in reaction extruders at temperatures that are preferably above 260° C.

The blends or alloys with homopolyamides are prepared by the usual processes known from the prior art.

The aliphatic homopolyamides advantageously used for this purpose are preferably chosen from the group comprising PA 69, PA 610, PA 612, PA 912, PA 1212, PA 11, PA 12, PA MACM12, PA MACMI, PA MACMT, PA PACM12, PA PACMI, PA PACMT, PA PACP12, PA PACPI, PA PACPT; PA IPD12, PA IPDT, PA BN12 and PA TCD12.

Polyamides, blends and alloys can optionally contain additives, preferably from the group of lubricants, UV and heat stabilizers, chain regulators, pigments, colorants, impact strength modifiers, flame retardants, fillers and reinforcing agents; among the latter, glass, minerals, fibers and fillers are preferred.

The invention also encompasses molded articles that can be made from the polyamides, blends or alloys according to the invention.

The molded articles according to the invention are distinguished not only by very high alternate bending strengths, which are documented over at least 1,000,000 alternate bending cycles (measured at 23° C. with dry test bars, 4 mm thick, in accordance with DIN 53442), but also at the same time by notched impact strengths of at least 10 and preferably 12 KJ/m$^2$ at 23°, and high heat distortion temperature as a consequence of Tg values of over 175° C., with excellent resistance to stress cracking in most solvents.

This combination of important properties is made possible not at least by high molecular weights, or high relative solution viscosities (eta relative), of the polyamides according to the invention, which are higher than 1.5 (measured in a concentration of 0.5% in m-cresol). This has not been described thus far in the prior art.

The following examples are intended to explain but not to limit the concept of the invention.

EXAMPLE 1

A 20 l autoclave was charged with 1015 g of dodecanediamine, 862 g of 1,4-cyclohexanedicarboxylic acid, 12 g of benzoic acid as a chain regulator and 10 g of H3PO3 and 5 l of demineralized water. Under stirring the autoclave was heated up slowly to 185° C. for 1 hour. Than it was heated up and hold at 285° C./250 Nm during 3 hours.

After a cooling, a decompression and a degassing phase, the polyamide was pressed out as a strand, passed under cold water and granulated. The dried granulate had the following properties:

| granulate evaluation: | | colorless brilliant transparent | |
|---|---|---|---|
| eta relative viscosity | (0.5% in m-cresole) | | 1.52 |
| endgroups NH2/COOH | ($\mu$equiv/g) | | 38/24 |
| glass transition point Tg | | | 136° C. |
| melt viscosity at 270° C./122.6N | (Pa · s) | | 530 |

Test bars were made from the granulate by injection molding: Thereby the test bars showed the following mechanical properties:

| impact strength, dry 23° C./-40° C. | (kJ/m$^2$) | n.b./160 |
|---|---|---|
| notched impact strength, dry 23° C./-40° C. | (kJ/m$^2$) | 5/3 |
| tensile strength at break, dry/conditioned, 23° C. | (N/mm$^2$) | 52/50 |
| elongation at break, dry/conditioned | (%) | 64/68 |
| tensile E-modulus, dry/conditioned, 23° C. | (N/mm$^2$) | 1740/1780 | n.b. = no break

Number of load change cycles (per DIN 53442), dry, 23° C., using bars 4 mm thick, in a C. Schenk alternate load testing apparatus, type PWO 150/1966: 1'300'000

Stress cracking behavior in methanol, acetone, ethyl acetate, toluene: no break

EXAMPLE 2

In the same manner as in example 1, 1015 g of dodecanediamine, 694 g of 1,4-cyclohexane dicarboxylic acid, 167 g of isophthalic acid, 12 g of benzoic acid and 10 g of H3PO3 and 5 l of demineralized water were placed into a autoclave and stirred to make a homogeneous mixture.

After an identical polycondensation reaction to that of Example 1, a transparent strand, was cooled and granulated.

The granulate properties were as follows:

| granulate evaluation | | colorless transparent |
|---|---|---|
| eta relative viscosity (0.5%, in m-cresol) | | 1.50 |
| end groups NH$_2$/COOH | ($\mu$equiv/g) | 40/30 |
| Tg | (°C.) | 139 |
| melt viscosity at 270° C./122.6N | (Pa · s) | 600 |

The injection molded test specimens had the following mechanical values:

| impact strength, dry 23° C./-40° C. | (kJ/m$^2$) | no break/120 |
|---|---|---|
| notched impact strength, dry 23° C./-40° C. | (kJ/m$^2$) | 5/3 |
| tensile strength at break, | (N/mm$^2$) | 60/60 |
| dry/conditioned 23° C. | | |
| elongation at break, dry/conditioned | (%) | 44/54 |
| tensile E-modulus, dry/conditioned 23° C. | (N/mm$^2$) | 1900/1940 |

Number of load change cycles per DIN 53442, dry, 23° C., using bars 4 mm thick, in a C. Schenk alternate load testing apparatus, type PWO 150/1966: 1'100'000

Stress cracking behavior in methanol, acetone, ethyl acetate, toluene: without break.

EXAMPLE 3

A 130 l autoclave was charged with 15.000 g dodecanediamine, 12.800 g 1,4-cyclohexane dicarboxylic acid, 30 g of a 50 weight % aqueous solution of H$_3$PO$_2$, 90 g benzoic acid and 12 l water, the charge was heated up to 120° C. and homogeneously mixed.

The polycondensation has been realized at 275° C.

After a cooling, a decompression and a degassing phase, the polyamide was pressed out as a strand, passed under cold water and granulated. The dried granulate had the following properties:

| granulate evaluation: | | colorless brilliant transparent | |
|---|---|---|---|
| eta relative viscosity | (0.5% in m-cresole) | | 1.73 |
| glass transition point Tg | (°C.) | | 138 |
| melt viscosity at 270° C./122.6N | (Pa · s) | | 784 |

Test bars were made from the granulate by injection molding: Thereby the test bars showed the following mechanical properties:

| impact strength, dry 23° C./-40° C. | (kJ/m$^2$) | n.b./n.b. |
|---|---|---|
| notched impact strength, dry 23° C. | (kJ/m$^2$) | 13,8 |
| tensile strength at break, | (N/mm$^2$) | 36/38 |
| dry/conditioned, 23° C. | | |
| elongation at break, dry/conditioned | (%) | 74/86 |
| tensile E-modulus, dry/conditioned, 23° C. | (N/mm$^2$) | 1380/1420 |

Number of load change cycles per DIN 53442, dry, 23° C., using bars 4 mm thick, in a C. Schenk alternate load testing apparatus, type PWO 150/1966: 1'864'000

I claim:

1. Transparent colorless, amorphous polyamide or blends or alloys thereof with at least one homopolyamide, the transparent polyamide has a relative solution viscosity of higher than 1.5 characterized in that the polyamide is made substantially of at least one unbranched aliphatic diamine, having from 8 to 14 carbon atoms and further of at least one cycloaliphatic dicarboxylic acid having 8 to 22 carbon atoms and having at least one cyclohexane ring, wherein said acid can be replaced by a maximum of 20 mol % of at least one aromatic dicarboxylic acid and wherein the polyamide or their blends or alloys optionally contain processing and/or usage dictated additives.

2. Polyamide of claim 1, characterized in that standardized test specimens made from said polyamide or blends or alloys thereof have alternate bending strengths of more than 1'000'000 cycles at 23° C.

3. Polyamide of claim 1,
characterized in that
the diamine is octanediamine, nonanediamine, decanediamine, undecanediamine or dodecanediamine.

4. Polyamide of claim 1,
characterized in that
the cycloaliphatic dicarboxylic acid is a cyclohexane dicarboxylic acid.

5. Polyamide of claim 1,
characterized in that
the cycloaliphatic dicarboxylic acid can be replaced by a maximum of 10 mol % of at least one aromatic dicarboxylic acid.

6. Polyamide of claim 1,
characterized in that
the aromatic dicarboxylic acid is terephthalic acid, isophthalic acid or 2,6-naphthalene dicarboxylic acid.

7. Polyamide of claim 1,
characterized in that
the additives are selected from the group consisting of lubricants, heat and UV stabilizers, chain regulators, pigments, colorants, impact strength modifiers, flame retardants, reinforcing agents and fillers.

8. Polyamide of claim 1,
characterized in that
the at least one homopolyamide is selected from the group consisting of PA 69, PA 610, PA 612, PA 912, PA 1212, PA 11, PA 12, PA MACM12, PA MACMI, PA MACMT, PA PACM12, PA PACMI, PA PACMT, PA PACP12, PA PACPI, PA PACPT; PA IPD12, PA IPDT, PA BN12 and PA TCD12.

9. Molded articles which are prepared from the polyamide or their blends or alloys with at least one homopolyamide of claim 1.

10. Molded article prepared from the polyamide or a blend or alloy thereof with at least one homopolyamide of claim 2.

11. Molded article prepared from the polyamide or a blend or alloy thereof with at least one homopolyamide of claim 3.

12. Molded article prepared from the polyamide or a blend or alloy thereof with at least one homopolyamide of claim 4.

13. Molded article prepared from the polyamide or a blend or alloy thereof with at least one homopolyamide of claim 5.

14. Molded article prepared from the polyamide or a blend or alloy thereof with at least one homopolyamide of claim 6.

15. Molded article prepared from the polyamide or a blend or alloy thereof with at least one homopolyamide of claim 7.

16. Molded article prepared from the polyamide or a blend or alloy thereof with at least one homopolyamide of claim 8.

* * * * *

UNITED STATES PATENT AND TRADEMARK OFFICE
CERTIFICATE OF CORRECTION

PATENT NO. : 5,773,558
DATED : Jun. 30, 1998
INVENTOR(S) : Hans Dalla Torre

It is certified that error appears in the above-identified patent and that said Letters Patent is hereby corrected as shown below:

Cover page, line [30], delete "[SE] Sweden" and insert therefor --[CH] Switzerland--.

Signed and Sealed this

Twenty-ninth Day of September, 1998

*Attest:*

BRUCE LEHMAN

*Attesting Officer*　　　　*Commissioner of Patents and Trademarks*